United States Patent [19]

Kawagoe et al.

[11] Patent Number: 4,954,957
[45] Date of Patent: Sep. 4, 1990

[54] CONTROL SYSTEM FOR ADAPTING SUSPENSION CHARACTERISTICS AND STEERING CHARACTERISTICS TO VEHICLE DRIVING CONDITION

[75] Inventors: Kenji Kawagoe; Hideo Ito; Masatsugu Yokote, all of Kanagawa, Japan

[73] Assignee: Nissan Motor Company, Limited, Japan

[21] Appl. No.: 301,526

[22] Filed: Jan. 23, 1989

[30] Foreign Application Priority Data

Jan. 25, 1988 [JP] Japan .................. 63-14127

[51] Int. Cl.⁵ ............... B60G 17/00; B62D 5/00
[52] U.S. Cl. ............... 364/424.05; 280/707; 180/79.1; 180/141
[58] Field of Search ............ 364/424.05; 280/707, 280/840; 180/79.1, 141, 142, 143

[56] References Cited

U.S. PATENT DOCUMENTS

| | | | |
|---|---|---|---|
| 4,652,010 | 3/1987 | Sugasawa | 280/707 |
| 4,697,237 | 9/1987 | Tanaka et al. | 364/424.05 |
| 4,803,627 | 2/1989 | Yasuike et al. | 364/424.05 |
| 4,803,630 | 2/1989 | Takizawa et al. | 364/424.05 |
| 4,807,128 | 2/1989 | Ikemoto et al. | 364/424.05 |
| 4,853,860 | 8/1989 | Achenbach | 364/424.05 |
| 4,865,148 | 9/1989 | Marumoto et al. | 180/79.1 |
| 4,869,528 | 9/1989 | Buma et al. | 280/707 |

*Primary Examiner*—Gary Chin
*Attorney, Agent, or Firm*—Lowe, Price, LeBlanc, Becker & Shure

[57] ABSTRACT

A control system for an automotive suspension system and a power steering system employs a steering operation pattern as a parameter representative of the vehicle traveling condition and vehicular driving characteristics. The control system performs selection of control modes or control characteristics based on the vehicle traveling condition and vehicle driving characteristics.

8 Claims, 10 Drawing Sheets

FIG. 2
FIG. 3
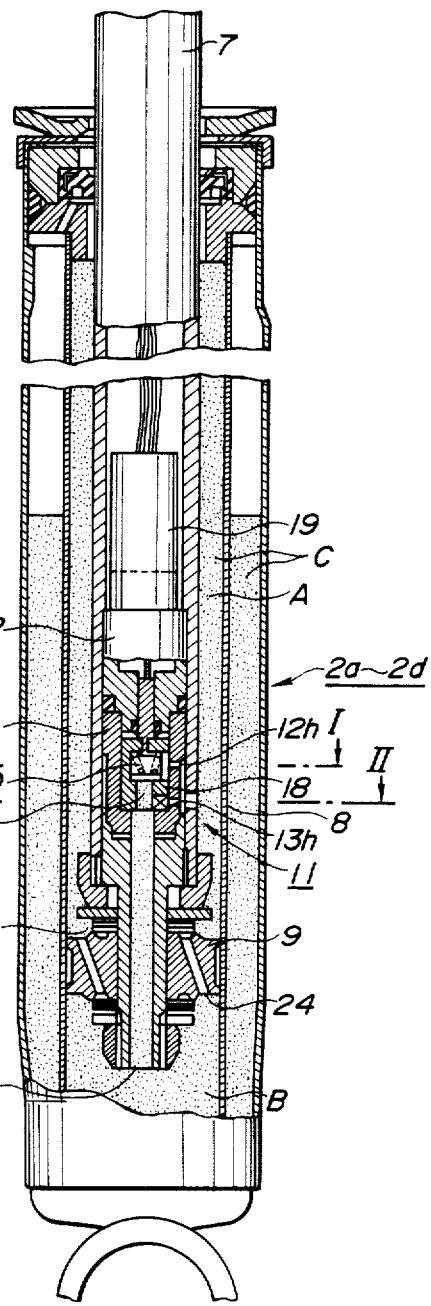
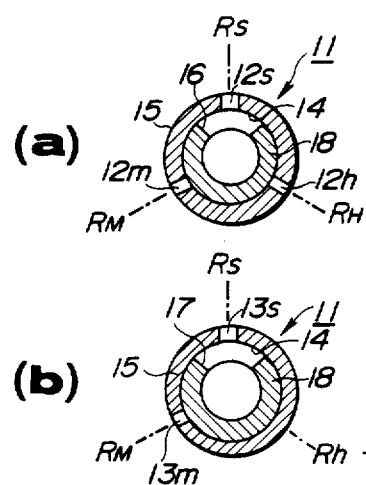

CONTROL SYSTEM FOR ADAPTING SUSPENSION CHARACTERISTICS AND STEERING CHARACTERISTICS TO VEHICLE DRIVING CONDITION

BACKGROUND OF THE INVENTION

1. Field of the Invention

The present invention relates generally to an automotive control system which controls suspension system and steering system in combination. More specifically, the invention relates to a control system which controls suspension characteristics depending upon the vehicle driving condition and, as well, controls power assist mode of the power steering system for adjusting assist force.

2. Description of the Background Art

Variable damping force suspension systems have been disclosed in U.S. Pat. No. 4,652,010, issued on Mar. 24, 1987, which has been commonly assigned to the assignee of the present invention, for example. For these suspension systems, control for selecting suspension characteristics detecting on the vehicle driving condition for accomplishing riding comfort, driving stability and suppression of attitude change.

On the other hand, control systems for power steering systems haven been proposed for adjusting hydraulic assist force and whereby for adjusting manual force required for steering operation generally depending upon vehicular driving speed. In the modern power steering control systems, the control systems can operate in various modes, such as heavy, medium and light modes, so that the driver can select steering system control characteristics depending on his own taste.

Such conventional suspension control systems and power steering control systems have been designed for controlling the suspension systems or power assist systems for the power steering systems depending upon instantaneous values of associated control parameters. In order words, the conventional control system detects instantaneous vehicle driving condition with the associated control parameters for determining the control characteristics thereof. However, in order to optimize suspension control characteristics and steering control characteristics, the control characteristics has to be adjusted depending upon the vehicle driving characteristics and driving condition.

SUMMARY OF THE INVENTION

Therefore, it is an object of the present invention to provide a control system for controlling an automotive suspension system and a power steering system in combination.

Another and more specific object of the invention is to provide a control system of suspension system and power steering system for selecting optimum control characteristics according to vehicle driving characteristics and traveling condition.

In order to accomplish aforementioned and other objects, a control system for an automotive suspension system and a power steering system, according to the present invention, employs a steering operation pattern as a parameter representative of the vehicle traveling condition and vehicular driving characteristics. The control system performs selection of control modes or control characteristics based on the vehicle traveling condition and vehicle driving characteristics.

According to one aspect of the invention, a control system for controlling an automotive suspension system and a power steering system in combination, comprises:

first sensor means for monitoring a vehicular speed for producing a vehicular speed indicative data;

second sensor means for monitoring steering angular displacement for producing a steering angle signal indicative of an offset from a neutral position;

third means, associated with the suspension system for controlling suspension characteristics at least between a first softer suspension mode and a second harder suspension mode on the basis of the vehicle speed signal and the steering angle signal, the third means being variable of suspension control characteristics at least between a first suspension control characteristics mode having lower responsive characteristics and a second suspension control characteristics mode having higher response characteristics;

fourth means, associated with the power steering system, for controlling assisting force to be distributed in the power steering system at least between a first smaller assisting force mode and a second greater assisting force mode on the basis of the vehicle speed signal, the fourth means being variable of assisting force control characteristics at least between a first assisting force control characteristics mode having lower responsive characteristics and a second assisting force control characteristics mode having higher response characteristics;

fifth means for detecting steering operation pattern matching with a preset reference pattern and counting up the occurrence of the steering operation pattern matching the preset pattern; and sixth means, periodically operable, for detecting vehicular driving condition on the basis of the vehicle speed indicative data, the counted value of the fifth means representative of frequency of occurrence of steering behaviour matching with the preset pattern, for setting control characteristics mode of the third and fourth means depending upon the vehicle driving condition.

According to another aspect of the invention, a control system for controlling an automotive suspension system and a power steering system in combination, comprises:

first sensor means for monitoring a vehicular speed for producing a vehicular speed indicative data, second sensor means for monitoring steering angular displacement for producing a steering angle signal indicative of offset from a neutral position;

third means, associated with the suspension system for controlling suspension characteristics at least between a first softer suspension mode and a second harder suspension mode, the third means comparing a predetermined control parameter data value with a predetermined first threshold value for selecting the first softer suspension mode when the parameter data value is smaller than the first threshold value and for selecting the second harder suspension mode when the parameter data value is greater than or equal to the first threshold value, the third means being variable of suspension control characteristics at least between a first suspension control characteristics mode setting the first threshold value at greater value for lower response characteristics and a second suspension control characteristics mode setting the first threshold value at smaller value for higher response characteristics., fourth means, associated with the power steering system, for controlling assisting force to be generated in the power steering system at least between a first smaller assisting force mode and a second greater assisting force mode on the basis of the vehicle speed signal, the fourth means comparing the vehicle speed signal with a second threshold value so that the second greater assisting force mode is selected when the vehicle speed signal value is maintained smaller than the second threshold value and the first smaller assisting force mode is selected when the vehicle speed signal value is greater than or equal to the second threshold value, the fourth means being variable of the second threshold value variation characteristics at least between a first assisting force control characteristics mode having lower responsive characteristics relative to the vehicle speed and a second assisting force control characteristics mode having higher response characteristics relative to the vehicle speed;

fifth means for detecting steering operation pattern matching with a preset reference pattern and counting up the occurrence of the steering operation pattern matching the preset pattern; and sixth means, periodically operable, for detecting vehicular driving condition on the basis of the vehicle speed indicative data, the counted value of the fifth means representative of frequency of occurrence of steering behaviour matching with the preset pattern, for setting control characteristics mode of the third and fourth means depending upon the vehicle driving condition.

In preferred construction, the fifth means contains a plurality of mutually distinct preset patterns including a first and second patterns, the fifth means comparing steering pattern with the first and second patterns to increment a first counter value when the steering patter matches the first pattern and to increment a second counter value when the steering pattern matches the second pattern. The first pattern may correspond to a steering pattern which appears during cornering and the second pattern may correspond to a steering pattern which appears during lane change.

BRIEF DESCRIPTION OF THE DRAWINGS

In the drawings:

FIG. 2 is a section of a variable damping force shock absorber employed in the preferred embodiment of the automotive suspension control system;

FIGS. 3(a) and 3(b) are sections respectively taken along lines I—I and II—II of FIG. 2;

DESCRIPTION OF THE PREFERRED EMBODIMENT

Figure 1:
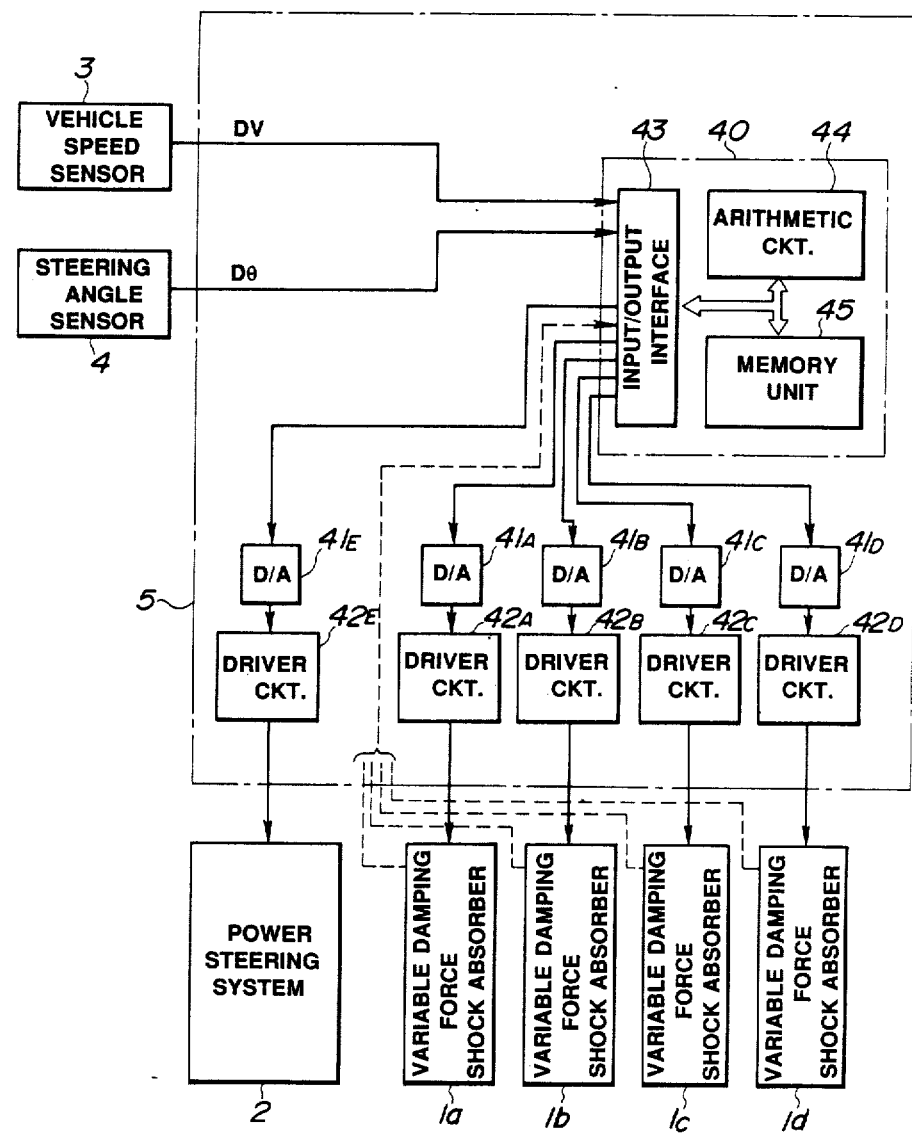
FIG. 1 is a schematic block diagram of the preferred embodiment of an automotive control system for a suspension system and a power steering system, according to the invention.

Referring now to the drawings, particularly to FIG. 1, the preferred embodiment of an automotive control system, according to the present invention, is designed to control suspension characteristics in a suspension system and a power assisting mode in a power steering system. The suspension system includes a plurality of variable damping force shock absorbers which generally represented by the reference numeral "1". Practically, respective shock absorbers 1a, 1b, 1c and 1d are provided in front-left, front-right, rear-left and rear-right suspension systems which are disposed between a vehicular body (not shown) and front-left, front-right, rear-left and rear-right wheels (not shown). The control system is also associated with a power steering system 2.

On the other hand, the control system includes a vehicle speed sensor 3 for monitoring a vehicle traveling speed to produce a vehicle speed signal Dv. The vehicle speed sensor 3 generally comprises a rotation sensor for monitoring rotation of a power transmission output shaft or propeller shaft for producing every given angle of angular displacement of the rotating shaft. Therefore, the vehicle speed signal DV is in a form of pulse signal having a pulse frequency proportional to the vehicle speed. The control system also includes a steering angle sensor 4 for monitoring angular displacement of the vehicular steering for producing a steering angle signal D$\theta$. In practice, the steering angle sensor 4 is attached to a steering column or associated with a steering wheel for producing pulse signals at every given angle of angular displacement of the steering column. The steering angle sensor has been disclosed in the Japanese Patent First (unexamined) Publication (Tokkai) Showa 62-201306 for example. The disclosure of the above-identified Japanese Patent First Publication will be herein incorporated by reference for the sake of disclosure. The steering angle signal D$\theta$ represents not only the steering angular position but also the steering direction. The vehicle speed signal DV and the steering angle signal D$\theta$ are input to a control unit 5. The control unit 5 controls the variable damping force shock absorbers 1a, 1b, 1c and 1d and the power steering system 2 on the basis of the vehicle speed signal DV and the steering angle signal D$\theta$.

FIG. 2 shows the preferred construction of the variable damping force shock absorber 1 to be employed in the preferred embodiment of the control system of FIG. 1. Though the shown embodiment employs a specific construction of the variable damping force shock absorber for implementing the present invention, it should be understood as mere example of implementation of the invention and thus can be modified in any way as being required.

In the construction of FIG. 2, the variable damping force shock absorber 1 includes a piston rod 7 disposing the lower part within an inner cylinder 8 and connected to a piston 9 thrustingly disposed within the inner cylinder. The piston rod 7 has a lower end section 7a having smaller diameter and extending through the piston 9. An axially extending opening 10 is formed through the lower end section 7a. A flow control unit 11 is provided opposing the upper end of the opening 10. The flow control unit 11 includes a cylindrical member 15 formed with circumferentially aligned three openings 12s, 12m and 12h and circumferentially aligned two openings 13s and 13m. The openings 13s and 13m are oriented at position axially shifted from the openings 12s, 12m and 12h and radially oriented at respectively the same angular positions to the openings 12s and 12m. The path areas of respective openings 12s, 12m and 12h are differentiated to each other so that the opening 12s has the greatest path area and the opening 12h has the smallest path area, as seen from FIG. 3(a). Similarly, the opening 13s has greater path area than that of the opening 13m, as shown in FIG. 3(b). These openings 12s, 12m and 12h and 13s and 13m are selectively aligned with openings 16 and 17 formed through a rotary valve member 18. The rotary valve member 18 defines a central chamber communicated with the axial opening 10 and whereby communicated with a lower fluid chamber B. The interior chamber of the rotary valve member 18 is separated into upper and lower sections by means of a check valve member 21 which is downwardly biased by a spring 20. The upper section opposes the opening 16 and the lower section opposes the opening 17. Therefore, the check valve member 21 operates to block fluid communication between the upper and lower section as long as the fluid pressure in the lower section introduced through the axial opening is smaller or equal to the spring force. The check valve member 21 is shifted upwardly by the fluid pressure overcoming the spring force to establish fluid communication between the upper and lower sections. Therefore, in the piston bounding stroke where piston moved downwardly with compressing the fluid in the lower fluid chamber B, the pressurized fluid may flow via both of the upper and lower sections of the interior chamber of the rotary valve, the openings 16 and 17 and respective one of the openings 12s, 12m and 12h and 13s and 13m into an upper fluid chamber A defined in the inner cylinder 8. In the piston bounding motion, a bounding path 24 is also effective to permit fluid flow from the lower fluid chamber B to the upper fluid chamber A. On the other hand, in the piston rebounding stroke where piston moves upwardly with compressing fluid in the upper fluid chamber A, fluid communication between the upper and lower fluid chambers A and B for causing fluid flow from the upper fluid chamber to the lower fluid chamber, is established via one of the openings 13s and 13m, the opening 17, the lower section of the interior chamber of the rotary valve 18 and the axial opening 10. Also, fluid flow from the upper fluid chamber A to the lower fluid chamber B is permitting through a rebounding path 23 formed through the piston 9.

As will be appreciated herefrom, the fluid flow efficiency is thus differentiated by the angular position of the rotary valve 18 to align one of the openings 12s, 12m and 12h with the opening 16. As seen, when the rotary valve 18 is placed to align the opening 12h to the opening 16, no opening is aligned with the opening 17. The rotary valve angular position where the openings 12s and 13s are aligned with the openings 16 and 17 will be referred to as "SOFT mode position". The rotary valve angular position where the openings 12m and 13m are aligned with the openings 16 and 17 will be referred to as "MEDIUM mode position". The rotary valve angular position where the opening 12h is aligned with the opening 16 and the opening 17 is blocked will be referred to as "HARD mode position". The rotary valve member 18 is associated with an electric motor 19 with reduction gear assembly. The electric motor 19 is driven by a driver current $I_M$ supplied from the control unit 5. The electric motor 19 is also associated with a position sensor, such as a potentiometer 22 to feedback valve position signal indicative of the angular position of the rotary valve member 18 to the control unit 5.

As will be appreciated herefrom, when the rotary valve member 18 is placed at the SOFT mode position, the path area for the fluid flow in the piston bounding motion is determined by the path areas of the bounding path 24 and the openings 12s and 13s for the fluid flow in the piston rebounding motion is determined by the path areas of the rebounding path 23 and the opening 13s. Therefore, the path area in the piston bounding motion is greater than that in the rebounding motion. Since the path areas of the openings 12s and 13s are respectively the greatest as set forth, the flow resistance is thus the smallest. Therefore, smallest damping force is generated at the SOFT mode position of the rotary valve member 18. When the rotary valve member 18 is placed at the MEDIUM mode position, the path area for the fluid flow in the piston bounding motion is determined by the path areas of the bounding path 24 and the openings 12m and 13m for the fluid flow in the piston rebounding motion is determined by the path areas of the rebounding path 23 and the opening 13m. Therefore, the path area in the piston bounding motion is greater than that in the rebounding motion. When the rotary valve member 18 is placed at the HARD mode position, the path area for the fluid flow in the piston bounding motion is determined by the path areas of the bounding path 24 and the opening 12h for the fluid flow in the piston rebounding motion is determined by the path areas of the rebounding path 23. As will be seen herefrom, at the HARD mode, flow resistance for the fluid flow becomes maximum to create the greatest damping force.

Figure 4:
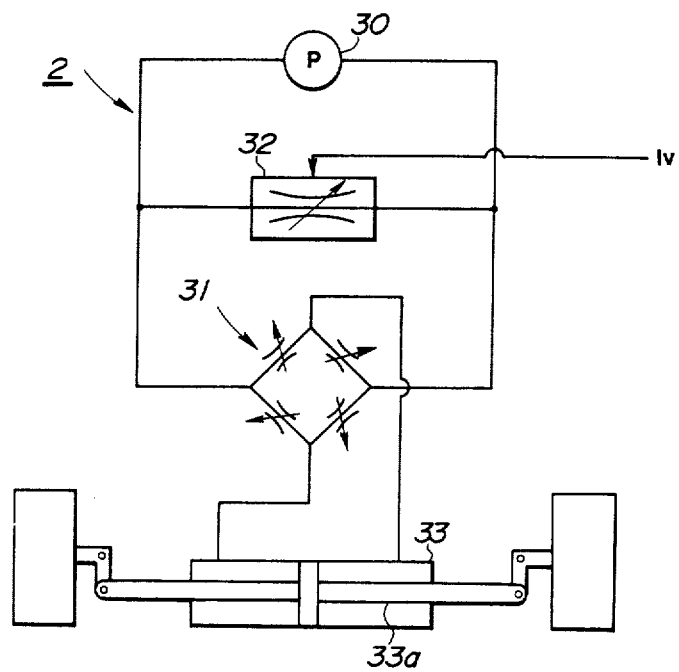
FIG. 4 is a circuit diagram of the preferred embodiment of the power steering system in the control system of FIG. 1.

FIG. 4 shows the schematic circuit construction of the power steering system 2 which is employed in the control system of FIG. 1. The power steering system 2 comprises a power steering pump 30 which is driven by an automotive engine. The inlet and outlet of the power steering pump 30 is connected to a steering valve 31 in series. An electromagnetic flow control valve 32 is disposed in parallel to the steering valve 31 with respect to the steering pump 30. The steering valve 31 has two outlets respectively connected to left and right working chambers of a power cylinder 33 to selectively supply and drain working fluid at the controlled pressure to driving steering rod 33a for steering operation.

The electromagnetic flow control valve 32 is connected to the control unit 5 to receive a driver current $I_V$ for adjusting flow resistance therethrough and whereby controlling distribution of the pressurized fluid to the steering valve 31. Therefore, when flow resistance in the electromagnetic flow control valve 32 becomes greater, distribution of the pressurized fluid for the steering valve 31 becomes greater to generate greater assisting force. On the other hand, when the flow resistance in the electromagnetic flow control valve 32 becomes smaller, smaller distribution rate of the pressurized fluid is supplied to the steering valve 31, smaller assist force may be generated to require greater manual steering force of the driver.

For selecting mode of suspension system between SOFT, MEDIUM and HARD modes and for controlling flow resistance in the electromagnetic flow control valve of the power steering system, the control unit 5 receives the vehicle speed signal Dv and the steering angle indicative signal D$\theta$. The control unit 5 comprises a microprocessor 40 including an input/output interface 43, an arithmetic circuit 44 and a memory unit 45. The interface 43 is connected to digital-to-analog (D/A) converters 41A, 41B, 41C, 41D and 41E respectively converting digital control signals into analog signals to be fed to driver circuits 42A, 42B, 42C, 42D and 42E. The driver circuits 42A, 42B, 42C and 42D are connected to respective motors in the variable damping force shock absorbers 1a, 1b, 1c and 1d to feed driver currents $I_M$. The driver circuit 42E is connected to the electromagnetic flow control valve 32 of the power steering system 5 to feed the driver current $I_V$. From the potentiometer 22 of respective variable damping force shock absorbers 1a, 1b, 1c and 1d, selected suspension mode indicative feedback signal is fed to the interface 43 of the microprocessor 40.

Operation of the preferred embodiment of the control system according to the present invention will be discussed herebelow with reference to FIGS. 5 through 14. Basically, the microprocessor 40 is fabricated as multi-purpose microprocessor for implementing various control operations, such as engine control and so forth. In order to govern various control operations, microprocessor 40 generally executes a main program as a background job to trigger various control programs in time sharing manner.

Figure 8:
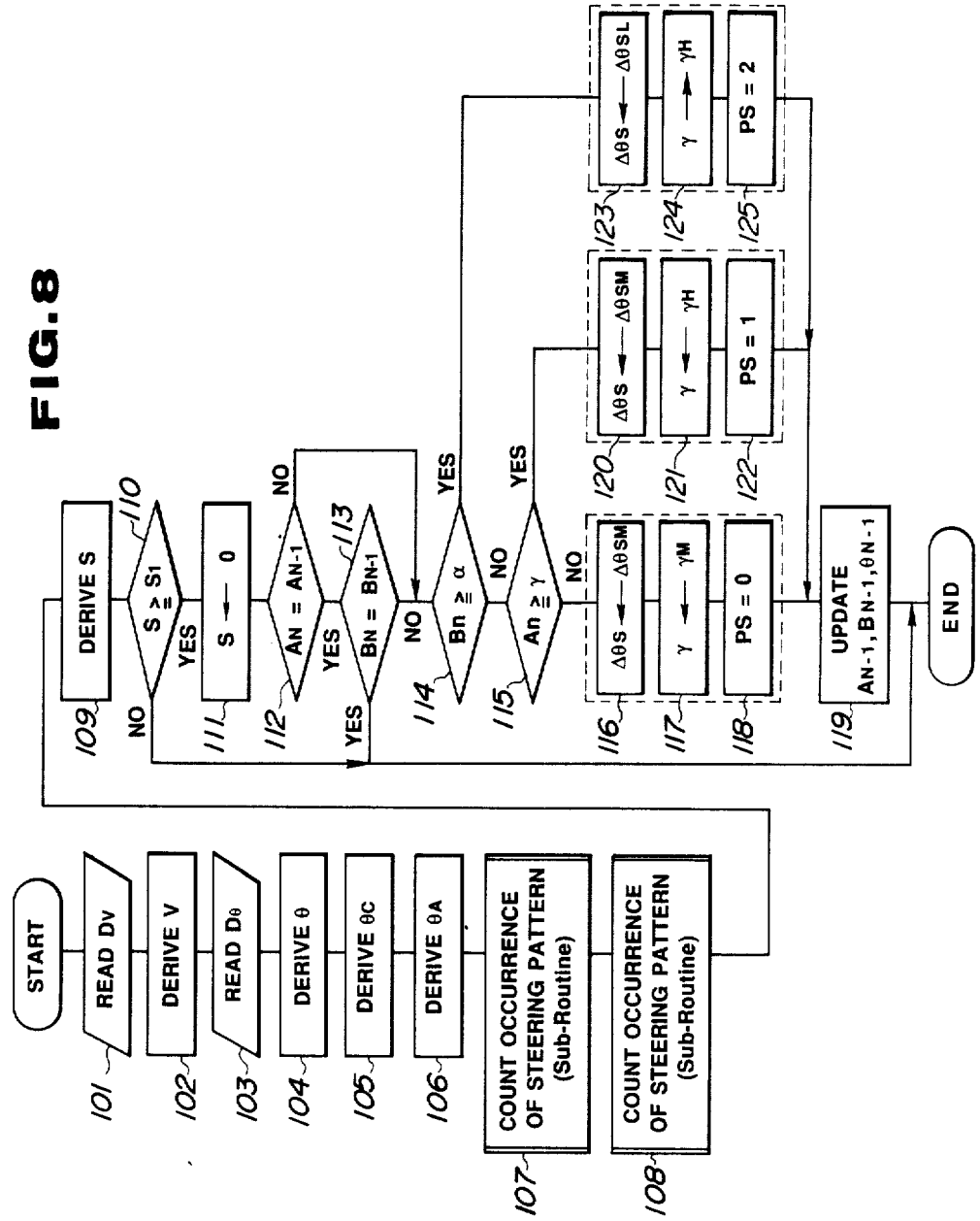
FIG. 8 is a flowchart of a control program for controlling the suspension system and the steering system.

Routine of FIG. 8 is triggered every given timing, e.g. every 20 msec. for setting operation mode of the suspension system and the power steering system. Immediately after starting execution, the vehicle speed signal DV as the pulse signal, is counted up over a predetermined period of time, at a step 101. Based on the counted value as counted at the step 101, a vehicle speed data V is derived at a step 102. At a step 103, the pulse form steering angle signal D$\theta$ is read. Based on the steering angle signal D$\theta$ read at the step 103, the steering angle data $\theta_N$ is derived at a step 104. Then, at a step 105, a steering neutral angle $\theta_c$ is derived. In practice, the steering neutral angle $\theta_c$ is derived by deriving an average value of the steering angle varying within a given traveling distance when the steering angular variation magnitude in the given traveling distance is smaller than or equal to a predetermined value. Based on the steering angle data $\theta_N$ and the steering neutral angle $\theta_c$, a steering angular displacement data $\theta_A$ is derived by subtracting the steering neutral angle $\theta_c$ from the steering angle data value $\theta_N$, at a step 106.

Figure 9:
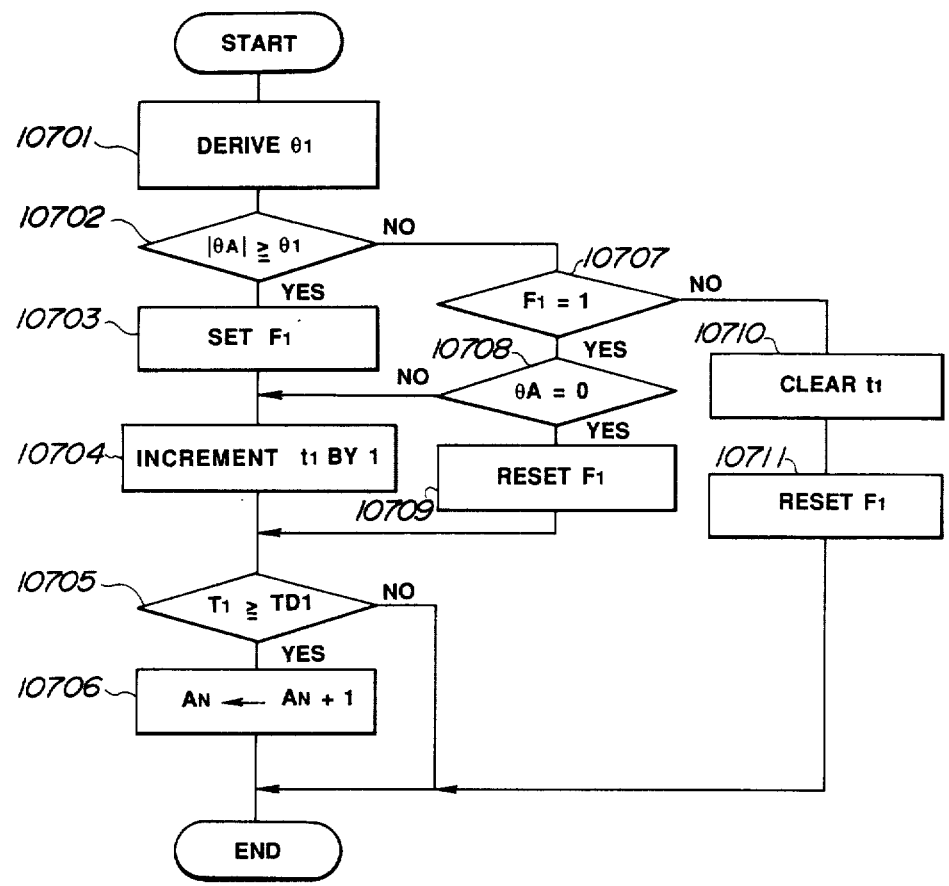
FIGS. 9 and 10 are flowchart of sub-routines executed with the control program of FIG. 8.

At a step 107, a sub-routine of FIG. 9 is triggered. At a step 10701 which is performed immediately after the sub-routine is triggered, a table of steering angle reference value $\theta_1$ stored in the memory unit 45 is looked up in terms of the vehicle speed data V in order to derive the steering angle reference value. Then, at a step 10702, the absolute value of the steering angular displacement data $\theta_A$ is compared with the steering angle reference value $\theta_1$. By comparing the steering angular displacement data $\theta_A$ with the steering angle reference value $\theta_1$, possibility of exerting of substantial lateral force can be detected.

When the absolute value of the steering angular displacement data $\theta_A$ as checked at the step 10702 is greater than or equal to the steering angle reference value $\theta_1$, a flag $F_1$ is set at a step 10703, which flag represents occurrence of the steering angular displacement. Then, at a step 10704, a timer counter value $t_1$ is incremented by one (1). Then, the incremented counter value $t_1$ is compared with a reference time value $T_{D1}$ at a step 10705. If the timer counter value $t_1$ is greater than or equal to the reference time value $T_{D1}$, as checked at the step 10705, a counter value $A_N$ is incremented by one (1) at a step 10706. After the step 10706, process returns to the routine of FIG. 8.

On the other hand, when the timer counter value $t_1$ is smaller than the reference time value $T_{D1}$ as checked at the step 10705, process directly returns to the routine of FIG. 8.

When the absolute value of the steering angular displacement data $\theta_A$ is smaller than the steering angle reference value $\theta_1$ as checked at the step 10702, the flag $F_1$ is checked at a step 10707. If the flag $F_1$ is set as checked at the step 10707, the steering angular displacement data $\theta_A$ is checked whether it is equal to zero (0), at a step 10708. When the steering angular displacement data $\theta_A$ as checked at the step 10708 is other than zero, process goes to the step 10704. On the other hand, when the steering angular displacement data $\theta_A$ is zero as checked at the step 10708, the flag $F_1$ is reset at a step 10709, and subsequently the process goes to the step 0705.

If the flag $F_1$ as checked at the step 10707 is not set, the timer counter value $t_1$ cleared at a step 10710. Thereafter, process goes to end and returned to the process of FIG. 8.

Figure 11:
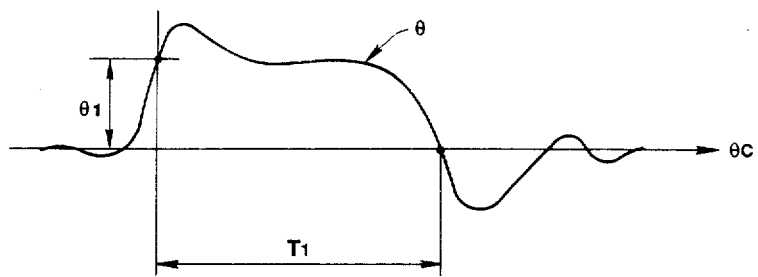
FIGS. 11 and 12 are charts showing standard steering operation pattern to be used for monitoring vehicle driving characteristics and traveling.

It should be noted that through the process of the sub-routine periodically triggered at the step 107 of the routine of FIG. 8, occurrence of one of reference steering pattern illustrated in FIG. 11 can be counted as the counter value $A_N$. Namely, in the reference steering pattern of FIG. 11, steering angular displacement $\theta_A$ greater than a vehicular speed dependent reference value $\theta_1$ is at first detected and subsequent returning to the steering neutral angle $\theta_c$ after a period longer than the reference time value $T_{D1}$ is detected.

Figure 10:
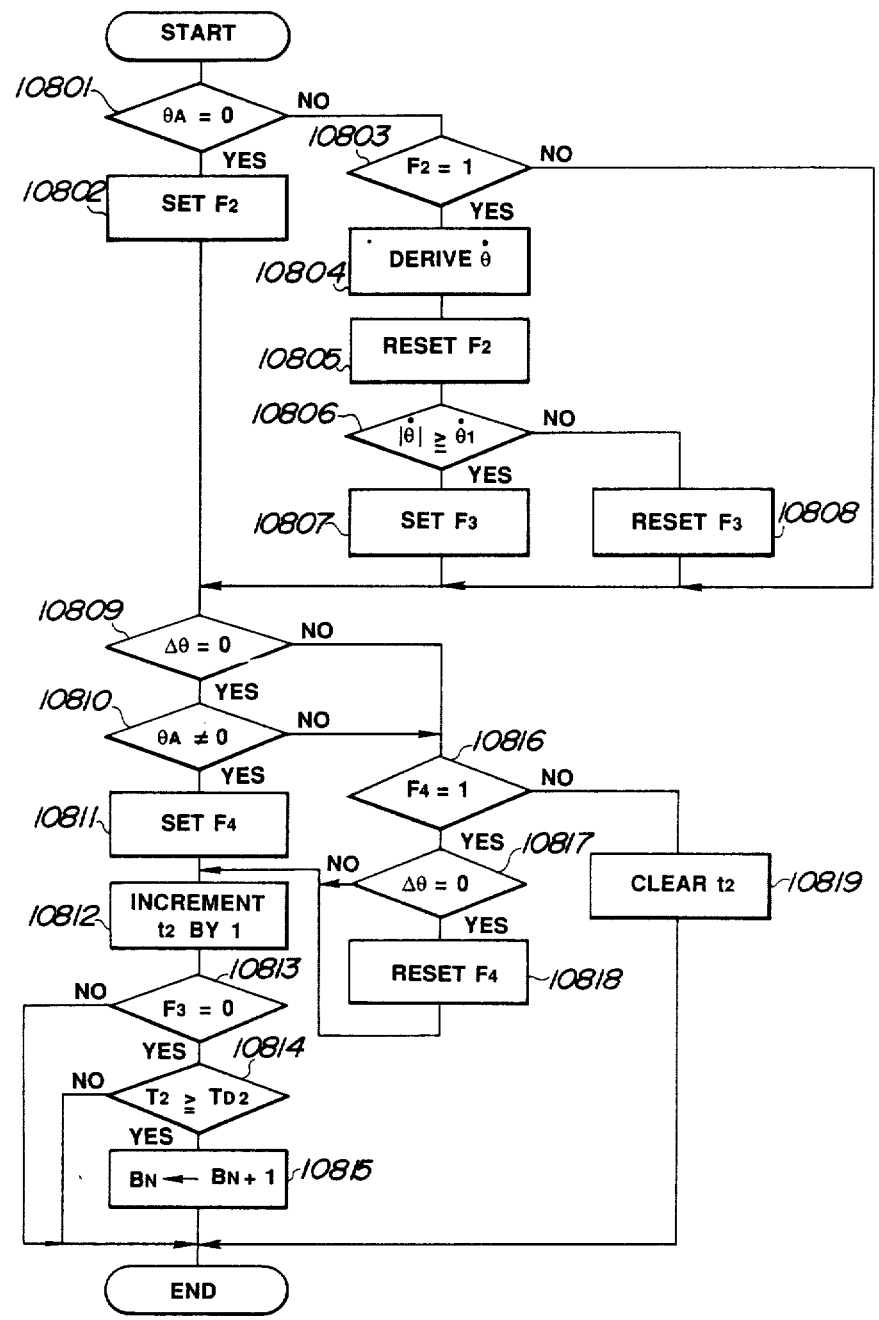
Figure 12:
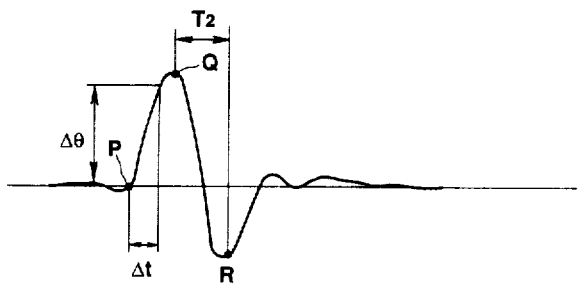

At a step 108, another sub-routine of FIG. 10 for detecting another reference steering pattern as illustrated in FIG. 12 is triggered. At a step 10801 immediately after triggering the process of FIG. 10, the steering angular displacement data $\theta_A$ is checked whether it represents the neutral position $\theta_c$ as illustrated in FIG. 12 as point P. When the steering angular displacement data $\theta_A$ is zero as checked at the step 10801, a flag $F_2$ is set as a step 10802.

On the other hand, when the steering angular displacement data $\theta_A$ is other than zero as checked at step 10801, the flag $F_2$ is checked at a step 10803. If the flag $F_2$ as checked at the step 10803 is set, a steering angular displacement rate $\theta$ is calculated at a step 10804. This arithmetic operation is performed by deriving steering angular difference $\Delta\theta$ in a predetermined steering angle sampling period $\Delta t$. Practically, the steering angular difference may be a difference of the steering angle data $\theta_N$ derived in the current execution cycle of the routine of FIG. 8 and that derived in the immediately preceding execution cycle. In such case, the sampling period $\Delta t$ may correspond to the execution interval of the routine of FIG. 8. After deriving the steering angular displacement rate $\theta$ at the step 10804, the flag $F_2$ is reset at a step 10805. Then the absolute value of the steering angular displacement rate $\theta$ is compared with a predetermined reference rate $\theta_1$, at a step 10806. When the absolute value of the steering angular displacement rate $\theta$ is greater than or equal to the predetermined reference rate $\theta_1$ as checked at the step 10806, a flag $F_3$ is set at a step 10807. On the other hand, when the absolute value of the steering angular displacement rate $\theta$ is smaller than the predetermined reference rate $\theta_1$ as checked at the step 10806, the flag $F_3$ is reset at a step 10808.

After setting the flag $F_2$ at the step 10802, setting the flag $F_3$ at the step 10807, resetting the flag $F_3$ or when the flag $F_2$ is not set as checked at the step 10803, process goes to a step 10809.

At a step 10809, the steering angular difference $\Delta\theta$ is checked whether it is zero (0) to represent the peak Q of FIG. 12. When the steering angular difference $\Delta\theta$ is zero as checked at the step 10809, the steering angular difference data $\theta_A$ is checked whether it is other than zero at a step 10810. When the steering angular difference data $\theta_A$ as checked at the step 10810 is other than zero, a flag $F_4$ which represents detection of the peak Q, is set at a step 10811. Thereafter, a timer counter value $t_2$ is incremented by one (1) at a step 10812. Then, the flag $F_3$ is checked at a step 10813. If the flag $F_3$ as checked at the step 10813 is not set process immediately goes END and return to the routine of FIG. 8. On the other hand, when the flag $F_3$ as checked at the step 10813 is set, the timer counter value $t_2$ incremented at the step 10812 is compared with a timer reference value $T_{D2}$ at a step 10814. When the timer counter value $t_2$ is smaller than the timer reference value $T_{D2}$, process immediately goes to return the routine of FIG. 8. On the other hand, when the timer counter valve $t_2$ as checked at the step 10814, is greater than or equal to the timer reference value $T_{D2}$, a counter value BN which is adapted to be incremented at every occurrence of the steering pattern of FIG. 12, is incremented by one (1), at a step 10815.

On the other hand, when the steering angular difference $\Delta\theta$ as checked at the step 10809 is not zero or the steering angular difference data $\theta_A$ as checked at the step 10810, process goes to a step 10816, at which the flag $F_4$ is checked whether the flag is set or not. If the flag $F_4$ already set as checked at the step 10816, check is performed whether the steering angular difference $\Delta\theta$ is zero at a step 10817. If the steering angular difference $\Delta\theta$ as checked at the step 10817 is zero, which represents detection of a peak R of FIG. 12, the flag $F_4$ is reset at a step 10818. Then, process goes to a step 10812. On the other hand, when the steering angular difference $\Delta\theta$ as checked at the step 10817 is not zero, process goes to the step 10812 jumping the step 10818.

When the flag $F_4$ as checked at the step 10816 is not set, the timer counter value $t_2$ is cleared at a step 10819 and thereafter process returns to the routine of FIG. 8.

At a step 109, a vehicular traveling distance S is calculated on the basis of the vehicle speed data V derived at the step 102 and the known interval $\Delta t$ of execution of the routine. The vehicular traveling distance in the known interval $\Delta t$ is then integrated to the former value. Then, the vehicle traveling distance S is compared with a given distance value $S_1$, such as that corresponding to a predetermined distance e.g. 1 km at a step 110. If the traveling distance S is smaller than the given distance value $S_1$, process immediately goes END. On the other hand, when the traveling distance S is greater than or equal to the given distance value $S_1$, the traveling distance S is cleared at a step 111.

At a step 112, the counter value $A_N$ set through periodically performed sub-routine of FIG. 9, is read out and compared with precedingly read out counter value $A_{N-1}$ which is the counter value at the immediately preceding occurrence of the step 112. If the counter value $A_N$ is equal to the counter value $A_{N-1}$ as compared at the step 112, process goes to a step 113, in which the counter value $B_N$ set through periodically performed sub-routine of FIG. 10, is read out and compared with precedingly read out counter value $B_{N-1}$ which is the counter value at the immediately preceding occurrence of the step 113. If the counter value $B_N$ is equal to the counter value $B_{N-1}$ as compared at the step 113, process goes to END because both counter value $A_N$ and $B_N$ are maintained at equal value and thus judgement can be made that the driving condition and traveling condition are unchanged. Therefore, no change of control characteristics of the suspension system and the power steering system are required.

If one of or both of the counter values $A_N$ and $B_N$ are different from the relevant former value $A_{N-1}$ and $B_{N-1}$ as checked at the steps 112 and 113, the counter value $B_N$ is compared with a threshold value c at a step 114. The threshold value $\alpha$ is set at a value to define a criterion of higher occurrence of quick steering accompanying quick reverse steering. In the shown embodiment, the threshold value is set at a value "3". When the counter value $B_N$ is smaller than the threshold value $\alpha$ as checked at the step 114, the counter value $A_N$ is compared with a threshold value $\gamma$ which represents a criterion of higher occurrence of relatively long period steering operation. In the practical embodiment, this threshold value $\beta$ is also set at a value "3".

When both of the counter values $A_N$ and $B_N$ are smaller than respective thresholds $\alpha$ and $\beta$, judgement can be made that vehicle is traveling on a straight road in substantially steady state without performing lane-change or correction of traveling direction. In such case, control mode "0" is selected. In the control mode "0", anti-rolling control constant $\Delta\theta_s$ is set at a predetermined neutral value $\Delta\theta_{Sm}$ at a step 116. Then, the rotary valve position $\gamma$ is set at $\gamma_M$ for setting the rotary valve member at the MEDIUM mode position, at a step 117. Also, a assisting force indicative parameter PS is set to "0" to represent the order for the maximum assisting force, at a step 118. Thereafter, the counter values $A_N$ and $B_N$ and the steering angular position data $\theta_N$ are set as $A_{N-1}$, $B_{N-1}$ and $\theta_{N-1}$ for the next cycle of control characteristics setting operations, at a step 119.

On the other hand, when the counter value $A_N$ greater than or equal to the threshold $\beta$ is detected as checked at the step 115, judgement is made that the vehicle is traveling with subjecting substantial lateral force, such as that in the winding road, and therefore, the steering pattern of FIG. 11 frequently appears. In such case, control mode "A" is selected to set the anti-rolling control constant $\Delta\theta_s$ at a predetermined neutral value $\Delta\theta_{SM}$ at a step 120. The rotary valve position $\gamma$ is set at $\gamma_H$ ordering HARD mode position of the rotary valve member, at a step 121. At a step 122, power assisting force indicative parameter PS is set at "1" which represents the minimum assisting force to be generated.

Figure 13:
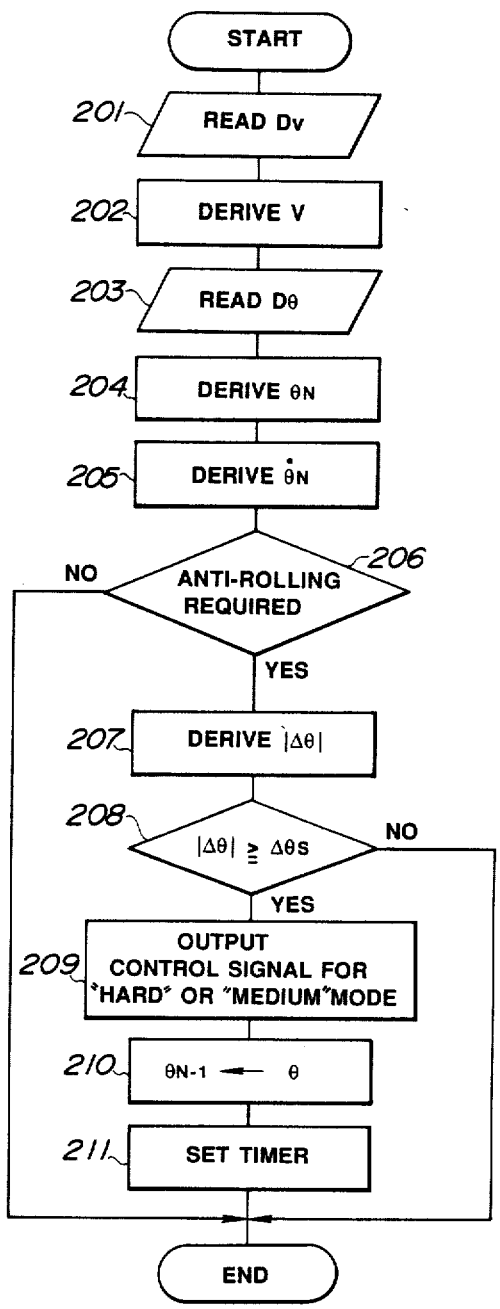
FIGS. 13 through 15 are interrupt routines to be executed by interrupting the control program of FIG. 8.

When the counter value $B_N$ is greater than the threshold $\alpha$ as checked at the step 114, the control mode "B" is selected to set the anti-rolling control constant $\Delta\theta_s$ at $\Delta\theta_{SL}$ which is smaller value than the neutral value $\Delta\theta_{SM}$, at a step 123. At a step 124, the rotary valve position $\beta$ is set at $\beta_H$ ordering the HARD mode position, and at a step 125, the power assisting force indicative parameter PS is set at "2" representative of medium assisting force intermediate between the maximum and minimum assisting force. FIG. 13 shows a flowchart of anti-rolling suspension control program which is also programmed as an interrupt routine for the background job and to be executed with a predetermined time intervals.

Similarly to the foregoing routine of FIG. 8, the vehicle speed signal DV as the pulse signal, is counted up over a predetermined period of time, at a step 201. Based on the counted value as counted at the step 201, a vehicle speed data V is derived at a step 202. At a step 203, the pulse form steering angle signal $D\theta$ is read. Based on the steering angle signal $D\theta$ read at the step 203, the steering angle data $\theta_N$ is derived at a step 204.

Figure 5:
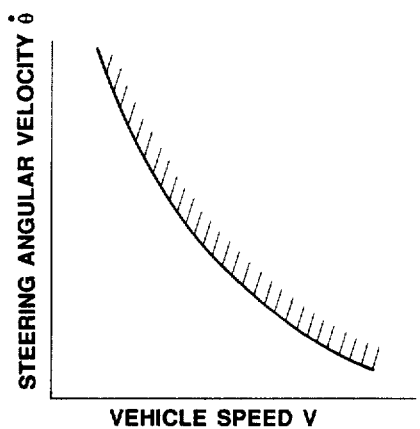
FIG. 5 is a graph showing variation of a steering angular velocity $\theta$ in relation to a vehicle speed V.

Then, the steering angular velocity $\dot{\theta}_N$ is derived on the basis of the steering angle data $\theta_N$, at a step 205. The steering angular velocity $\dot{\theta}_N$ derived at the step 205 is temporarily stored in the memory unit 45. At a step 206, vehicular rolling magnitude table of FIG. 5, is looked up in terms of the steering angular velocity $\dot{\theta}_N$ and the vehicle speed V. Namely, when the horizontal line extending through the value $\dot{\theta}_N$ intersects with a vertical line extending through the vehicle speed V within a zone II, judgement is made that the anti-rolling operation has to be performed and otherwise not.

When judgement is made that the anti-rolling suspension control is to be performed at the step 206, an absolute value of steering angle variation $\Delta\theta(=|\theta_N-\theta_{N-1}|)$ is calculated at a step 207. The absolute value of the steering angle variation $\Delta\theta$ is then compared with the anti-rolling control constant $\Delta\theta_s$ at a step 208. When the absolute value of the steering angle variation $\Delta\theta$ is smaller than the anti-rolling control constant $\Delta\theta_s$ as checked at the step 208, process goes END. On the other hand, when the absolute value of the steering angle variation $\Delta\theta$ is greater than or equal to the anti-rolling control constant $\Delta\theta_s$ as checked at the step 208, then, control current $I_M$ is supplied to respective motor of the variable damping force shock absorbers 1a, 1b, 1c and 1d to the position ordered by the rotary valve position data $\gamma$ at a step 209. As discussed above, since the rotary valve position data $\gamma$ is set at a value $\gamma_M$ or $\gamma_H$ respectively ordering MEDIUM mode position or HARD mode position of the rotary valve member, the rotary valve members of respective shock absorbers are driven to either the MEDIUM or HARD mode positions.

Then, the steering angle data $\theta_N$ is set at $\theta_{N-1}$ at a step 210. At a step 211, a timer for maintaining the rotary valve member at the hardened mode position is set at a predetermined value. Then, process goes to END.

Figure 14:
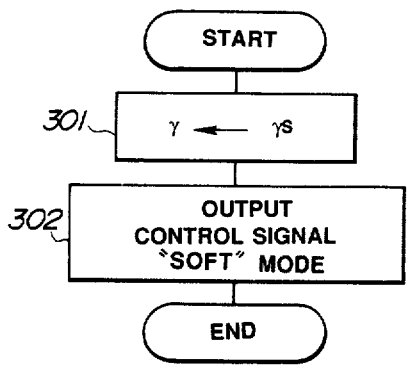

When the timer period as set at the predetermined value at the step 211 of the process of FIG. 13 expires, a routine of FIG. 14 is triggered. In execution of the routine of FIG. 14, the rotary valve position data $\gamma$ is set at $\gamma_S$ ordering SOFT mode position of the rotary valve member at a step 301. Then, the control current $I_M$ ordering SOFT mode is output to drive the rotary valve member to the SOFT mode position at a step 302.

Figure 6:
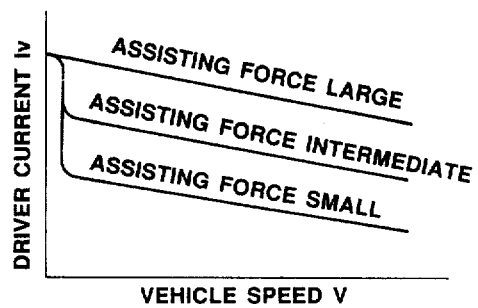
FIG. 6 is graph showing variation of a steering control drive current $I_V$ in relation to a vehicle speed V.
Figure 7:
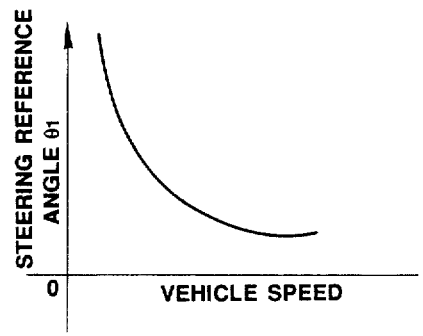
FIG. 7 is a graph showing steering angle reference value $\theta_1$ in relation to the vehicle speed V.
Figure 15:
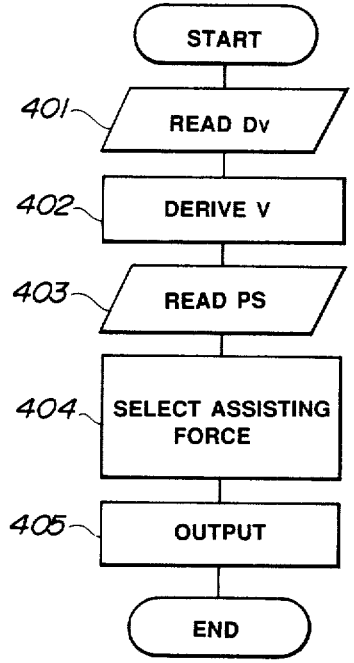

FIG. 15 is a flowchart showing routine for controlling the assisting force to be generated by the power steering system. The shown routine is also triggered at every given interval. Immediately after starting execution, the vehicle speed signal Dv in a form of pulse train is counter over a given period of time, at a step 401. Based on the counted value, the vehicle speed data V is derived at a step 402. Then, the power assisting force indicative parameter data PS is read out to select one of power assisting force variation characteristics shown in FIG. 6 is selected at a step 403. Then, driver current value $I_V$ is derived according to the selected one of the power assisting force variation characteristics in terms of the vehicle speed data V, at a step 404. Thereafter, the driver current $I_V$ is output to the electromagnetic valve in the power steering system.

As set forth, the shown embodiment of the control system can effectively perform suspension control and assisting power control for the power suspension system according to vehicular driving condition which is detected on the basis of the steering pattern and the vehicular speed.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment has been directed to the variable damping force shock absorber for controlling suspension characteristics, it may be possible to replace the shock absorber with a pneumatic spring system for adjusting the suspension characteristics. Furthermore, though the shown embodiment is directed to anti-rolling suspension control, the invention will be applied not only for anti-rolling control but also for any other attitude suppressive suspension control.

What is claimed is:

1. A control system for controlling an automotive suspension system and a power steering system in combination, comprising:

first sensor means for monitoring a vehicular speed for producing a vehicular speed signal;

second sensor means for monitoring steering angular displacement for producing a steering angle signal indicative of offset from a neutral position;

third means, associated with said suspension system for controlling suspension characteristics at least between a first softer suspension mode and a second harder suspension mode on the basis of said vehicle speed signal and said steering angle signal, said third means alters said suspension control characteristics at least between a first suspension control characteristics mode having lower responsive characteristics and a second suspension control characteristics mode having higher response characteristics;

fourth means, associated with said power steering system, for controlling assisting force to be distributed in said power steering system at least between a first smaller assisting force mode and a second greater assisting force mode on the basis of said vehicle speed signal, said fourth means alters the assisting force control characteristics at least between a first assisting force control characteristics mode having lower responsive characteristics and a second assisting force control characteristics mode having higher response characteristics;

fifth means for detecting steering operation pattern matching with a preset reference pattern and counting up the occurrence of the steering operation pattern matching said preset pattern; and sixth means, periodically operable, for detecting vehicular driving condition on the basis of said vehicle speed signal, said counted value of said fifth means representative of frequency of occurrence of steering behaviour matching with said preset pattern, for setting one of said control characteristics modes correspond to said third and fourth means depending upon said vehicle driving condition.

2. A control system as set forth in claim 1, wherein said fifth means contains a plurality of mutually distinct preset patterns including a first and second patterns, said fifth means comparing said steering pattern with said first and second patterns to increment a first counter value when said steering pattern matches said first pattern and to increment a second counter value when said steering pattern matches said second pattern.

3. A control system as set forth in claim 2, wherein said first pattern corresponds to a steering pattern which appears during cornering.

4. A control system as set forth in claim 2, wherein said second pattern corresponds to a steering pattern which appears during lane change.

5. A control system for controlling an automotive suspension system and a power steering system in combination, comprising:
first sensor means for monitoring a vehicular speed for producing a vehicular speed signal;
second sensor means for monitoring steering angular displacement for producing a steering angle signal indicative of offset from a neutral position;
third means, associated with said suspension system for controlling suspension characteristics at least between a first softer suspension mode and a second harder suspension mode on the basis of said vehicle speed signal and said steering angle signal, said third means comparing a predetermined control parameter data value with a predetermined first threshold value for selecting said first softer suspension mode when said parameter data value is smaller than said first threshold value and for selecting said second harder suspension mode when said parameter data value is greater than or equal to said first threshold value, said third means alters said suspension control characteristics at least between a first suspension control characteristics mode setting said first threshold value at greater value for lower response characteristics and a second suspension control characteristics mode setting said first threshold value at smaller value for higher response characteristics;
fourth means, associated with said power steering system, for controlling assisting force to be generated in said power steering system at least between a first smaller assisting force mode and a second greater assisting force mode on the basis of said vehicle speed signal, said fourth means comparing said vehicle speed signal with a second threshold value so that said second greater assisting force mode is selected when said vehicle speed signal value is smaller than said second threshold value and said first smaller assisting force mode is selected when said vehicle speed signal value is greater than or equal to said second threshold value, said fourth means alters the assisting force control characteristics at least between a first assisting force control characteristics mode having lower responsive characteristics relative to said vehicle speed and a second assisting force control characteristics mode having higher response characteristics relative to said vehicle speed;
fifth means for detecting steering operation pattern matching with a preset reference pattern and counting up the occurrence of the steering operation pattern matching said preset pattern; and
sixth means, periodically operable, for detecting vehicular driving condition on the basis of said vehicle speed signal, said counted value of said fifth means representative of frequency of occurrence of steering behaviour matching with said preset pattern for setting one of said control characteristics modes correspond to said third and fourth means depending upon said vehicle driving condition.

6. A control system as set forth in claim 5, wherein said fifth means contains a plurality of mutually distinct preset patterns including a first and second patterns, said fifth means comparing said steering pattern with said first and second patterns to increment a first counter value when said steering pattern matches said first pattern and to increment a second counter value when said steering pattern matches said second pattern.

7. A control system as set forth in claim 6, wherein said first pattern corresponds to a steering pattern which appears during cornering.

8. A control system as set forth in claim 6, wherein said second pattern corresponds to a steering pattern which appears during lane change.

* * * * *